United States Patent
Wirth, Jr. et al.

(10) Patent No.: US 8,336,868 B2
(45) Date of Patent: Dec. 25, 2012

(54) NO-MAR WORKPIECE SUPPORT

(75) Inventors: John Wirth, Jr., Dubois, WY (US); Jay L. Sanger, Casper, WY (US); Paul Brutsman, Casper, WY (US); Mark K. McCool, Casper, WY (US)

(73) Assignee: Woodworker's Supply, Inc., Casper, WY (US)

( * ) Notice: Subject to any disclaimer, the term of this patent is extended or adjusted under 35 U.S.C. 154(b) by 17 days.

(21) Appl. No.: 12/923,358

(22) Filed: Sep. 16, 2010

(65) Prior Publication Data
US 2012/0068396 A1    Mar. 22, 2012

(51) Int. Cl.
*B23B 3/00* (2006.01)
*G08B 21/00* (2006.01)
*B23Q 3/00* (2006.01)

(52) U.S. Cl. ............. 269/289 R; 269/296; 340/540

(58) Field of Classification Search ........... 269/289, 269/296, 48.1; 340/540, 545, 571, 572, 573, 340/689
See application file for complete search history.

(56) References Cited

U.S. PATENT DOCUMENTS

| | | | | |
|---|---|---|---|---|
| 4,825,499 | A * | 5/1989 | Baptiste | 15/227 |
| D304,277 | S * | 10/1989 | Wolff et al. | D7/698 |
| 5,085,011 | A * | 2/1992 | Smith | 451/41 |
| 5,212,910 | A * | 5/1993 | Breivogel et al. | 451/530 |
| 5,236,387 | A * | 8/1993 | Simon | 452/194 |
| 5,492,594 | A * | 2/1996 | Burke et al. | 438/14 |
| 5,605,574 | A * | 2/1997 | Tsunashima et al. | 118/500 |
| 5,868,188 | A * | 2/1999 | Fukuda | 144/372 |
| 6,206,356 | B1 * | 3/2001 | Beloff | 269/289 R |
| D446,075 | S * | 8/2001 | Bodum | D7/388 |
| D447,074 | S * | 8/2001 | Chan | D10/104.1 |
| 6,286,405 | B1 * | 9/2001 | Hamm | 83/781 |
| 6,641,463 | B1 * | 11/2003 | Molnar | 451/41 |
| 6,780,091 | B2 * | 8/2004 | Mizomoto et al. | 451/67 |
| 6,951,594 | B2 * | 10/2005 | Tweel et al. | 156/230 |
| 6,994,334 | B2 * | 2/2006 | Jones et al. | 269/289 R |
| 7,416,166 | B1 * | 8/2008 | Shaw | 254/88 |
| D591,914 | S * | 5/2009 | Witham | D30/199 |
| D600,411 | S * | 9/2009 | O'Reilly | D28/63 |
| D602,207 | S * | 10/2009 | Hull | D29/117.1 |
| 7,654,510 | B2 * | 2/2010 | Nishida | 269/289 R |
| 7,726,540 | B2 * | 6/2010 | Cheng et al. | 228/49.1 |
| 7,845,694 | B1 * | 12/2010 | Lockwood | 294/1.3 |
| D631,692 | S * | 2/2011 | Ho et al. | D7/388 |
| 7,909,074 | B2 * | 3/2011 | Yu | 144/286.5 |

(Continued)

OTHER PUBLICATIONS

Rockler Bench Cookies: Lift Grip and Protect! web page; http://www.rockler.com/product_popup.cfm?page=21496; 1 page; no date.

(Continued)

*Primary Examiner* — Lee D Wilson
*Assistant Examiner* — Alvin Grant
(74) *Attorney, Agent, or Firm* — Nixon & Vanderhye PC

(57) ABSTRACT

A workpiece support that presents a generally planar workpiece contacting surface having high friction, gripping pad(s) that will not mar a workpiece surface, and thus provides a versatile accessory for home hobbyists and artisans alike that protects the supported surface of the workpiece. By providing a non-marring workpiece support, such as that illustrated in FIGS. 1, 8 and 13, to support a workpiece with respect to a work bench surface, the workpiece can be kept from slipping while routing, sanding, carving and the like. It can elevate workpieces for edge work and finishing, or simply suspend and protect projects from marring during drying or between work sessions.

20 Claims, 10 Drawing Sheets

U.S. PATENT DOCUMENTS

| | | | | |
|---|---|---|---|---|
| 7,967,043 | B2* | 6/2011 | Miller et al. | 144/178 |
| 8,006,966 | B2* | 8/2011 | Kwon | 269/48.1 |
| 8,056,890 | B2* | 11/2011 | Engel | 269/296 |
| 2009/0283035 | A1 | 11/2009 | Bucci | |
| 2010/0183814 | A1* | 7/2010 | Rios et al. | 427/387 |
| 2011/0041779 | A1* | 2/2011 | Hurwitz | 119/850 |
| 2011/0041780 | A1* | 2/2011 | Hurwitz | 119/850 |

OTHER PUBLICATIONS

Painter's Pyramid, web page; http://www.painterspyramid.com; 1 page; no date.

Alrt Technology Solutions: Products, ALRT Pet Mediciation Reminder Devices, web page www.alrt.com/products/pmr 1 page, date unknown.

\* cited by examiner

NO-MAR WORKPIECE SUPPORT

BACKGROUND OF THE INVENTION

The present invention relates to a workpiece support.

Home hobbyists and artisans alike may need to elevate workpieces for edge finishing. Also, it is sometimes necessary to finish both faces of a workpiece, as in cabinet door finishing, and it is necessary to support a previously finished face of the workpiece in a non-marring manner while the opposite face is being sanded, carved, finished, etc.

An example of a prior art workpiece support is a painter's pyramid. While the painter's pyramid is effective to elevate the workpiece during edge and surface finishing, the painter's pyramid has an apex which may mar the supported side of the workpiece, particularly if pressure is applied to the top surface of the workpiece. Moreover, the contact surface with the workpiece is limited, so that stability may be compromised and no means are provided to secure the support with respect to a work bench, except at the edge of the work bench, which may limit versatility to the product.

BRIEF DESCRIPTION OF THE INVENTION

The present invention provides a workpiece support that presents a generally planar workpiece contacting surface having a high friction, gripping pad that will not mar a workpiece surface, and thus provides a versatile workpiece support that protects the supported surface of the workpiece.

Thus, the invention may be embodied in a workpiece support comprising: a main body having first and second generally planar working surfaces disposed in parallel and supported in spaced apart relation; at least one elastomeric pad disposed on the surface of each of said first and second working surfaces; and said first and second working surfaces have correspondingly shaped, irregularly contoured outer peripheral edges.

The invention may be embodied in a workpiece support comprising a housing having first and second major surfaces disposed in spaced apart, parallel relation and an outer peripheral sidewall extending between said major surfaces, said outer peripheral sidewall defining an irregular outer periphery that is asymmetrical with respect to a line transverse to a longitudinal center line of said housing, and at least one elastomeric pad disposed on each of said first and second major surfaces.

DETAILED DESCRIPTION OF THE INVENTION

Figure 8:
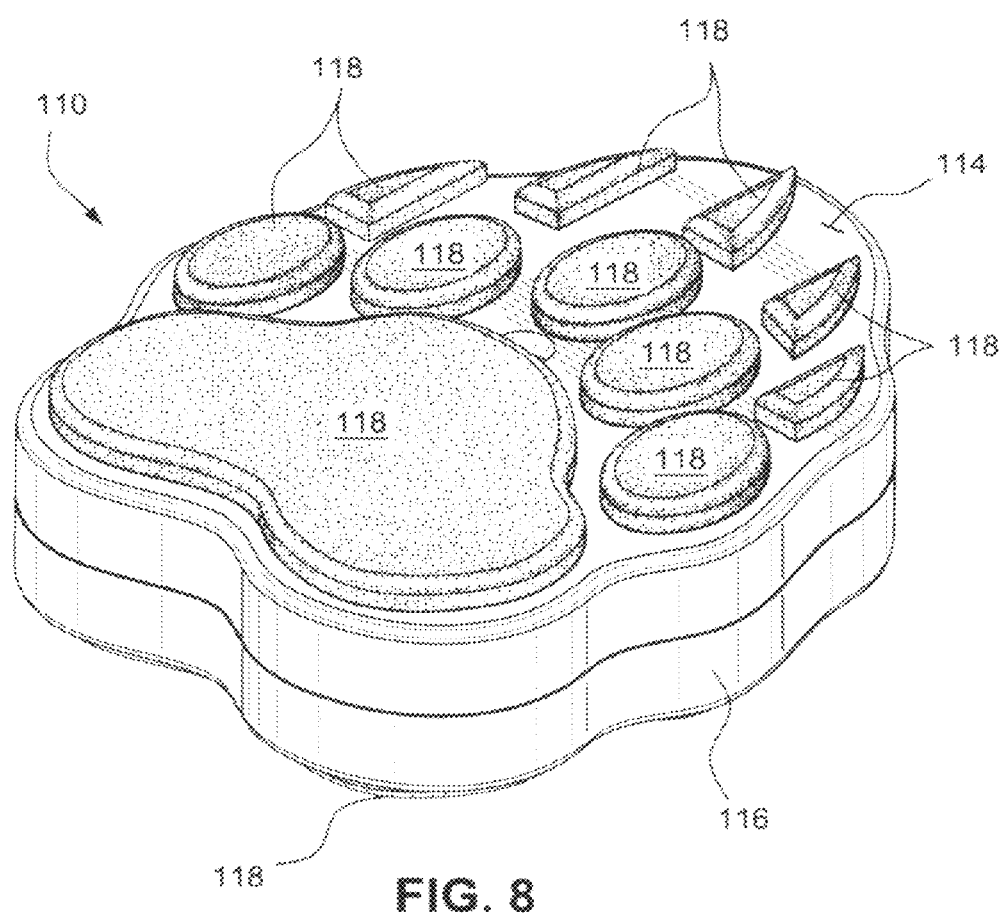
FIG. 8 is a perspective view of a no-mar bench paw workpiece provided in accordance with another example embodiment of the invention.
Figure 9:
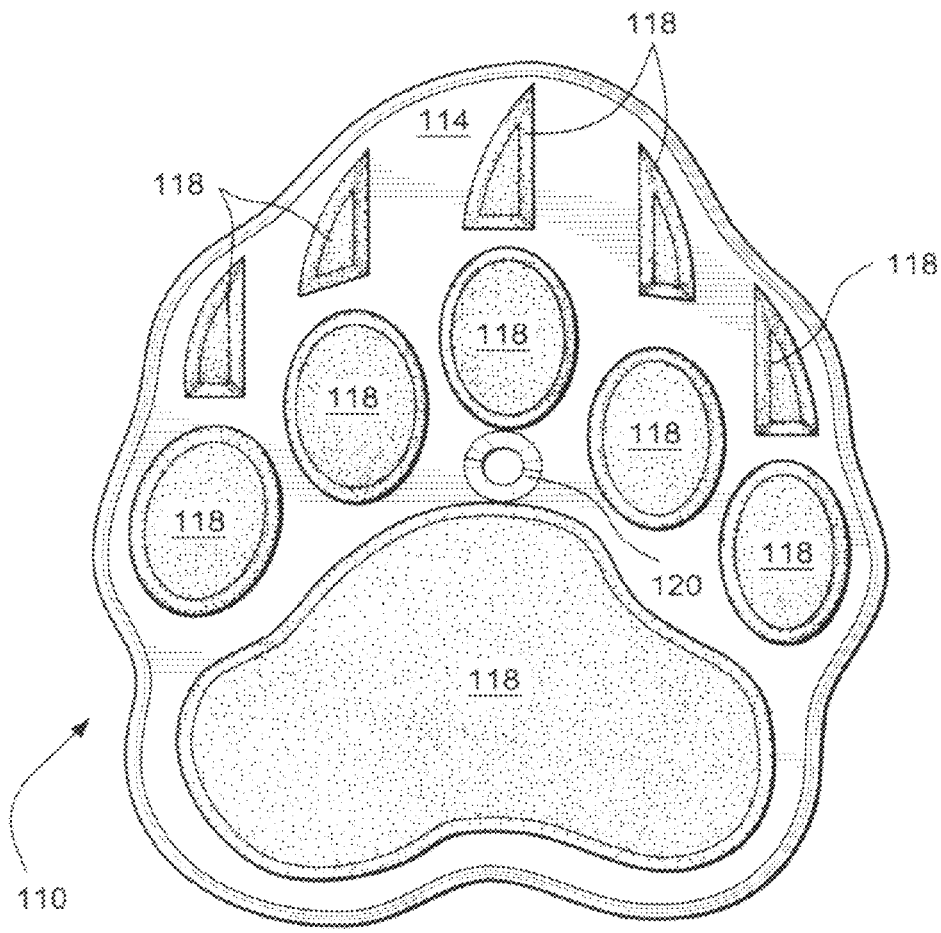
FIG. 9 is a top plan view of the embodiment of FIG. 8.
Figure 10:
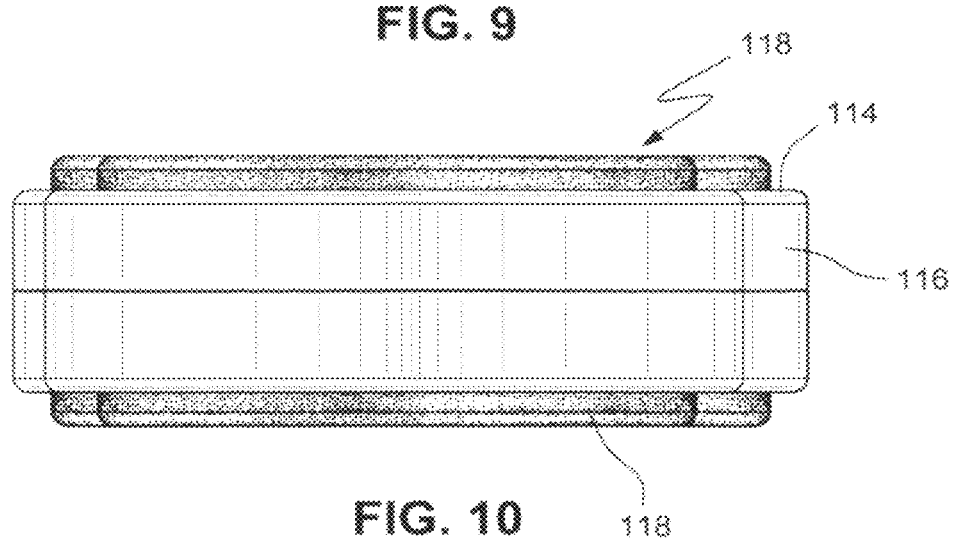
FIG. 10 is a rear elevational view of the embodiment of FIG. 8.
Figure 11:
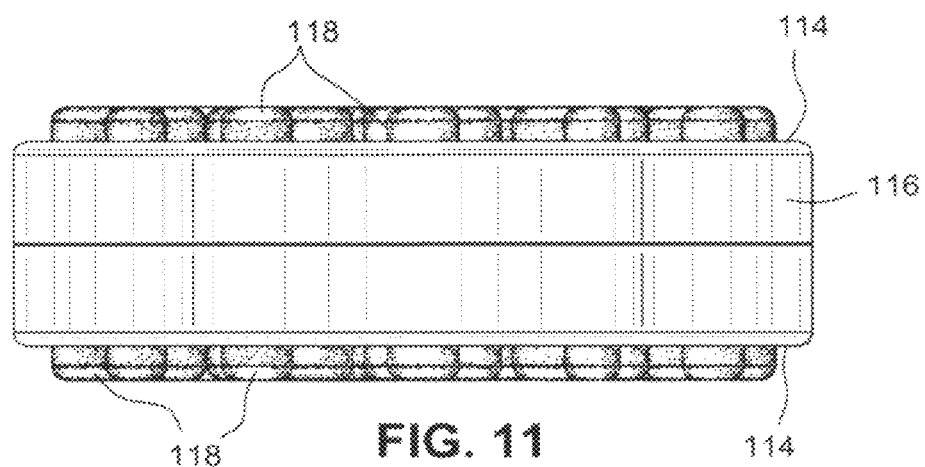
FIG. 11 is a front elevational view of the embodiment of FIG. 8.
Figure 12:
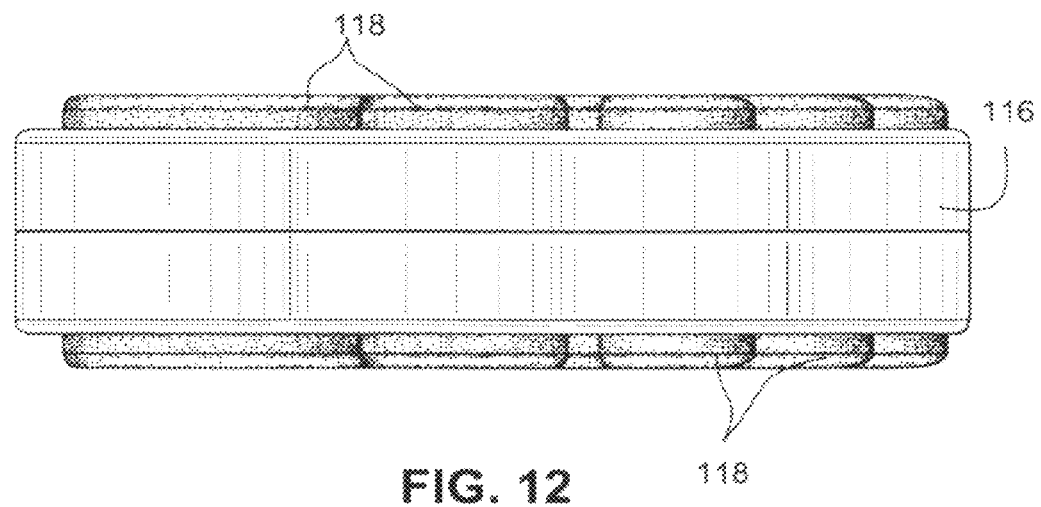
FIG. 12 is a right side elevational view of the embodiment of FIG. 8.
Figure 13:
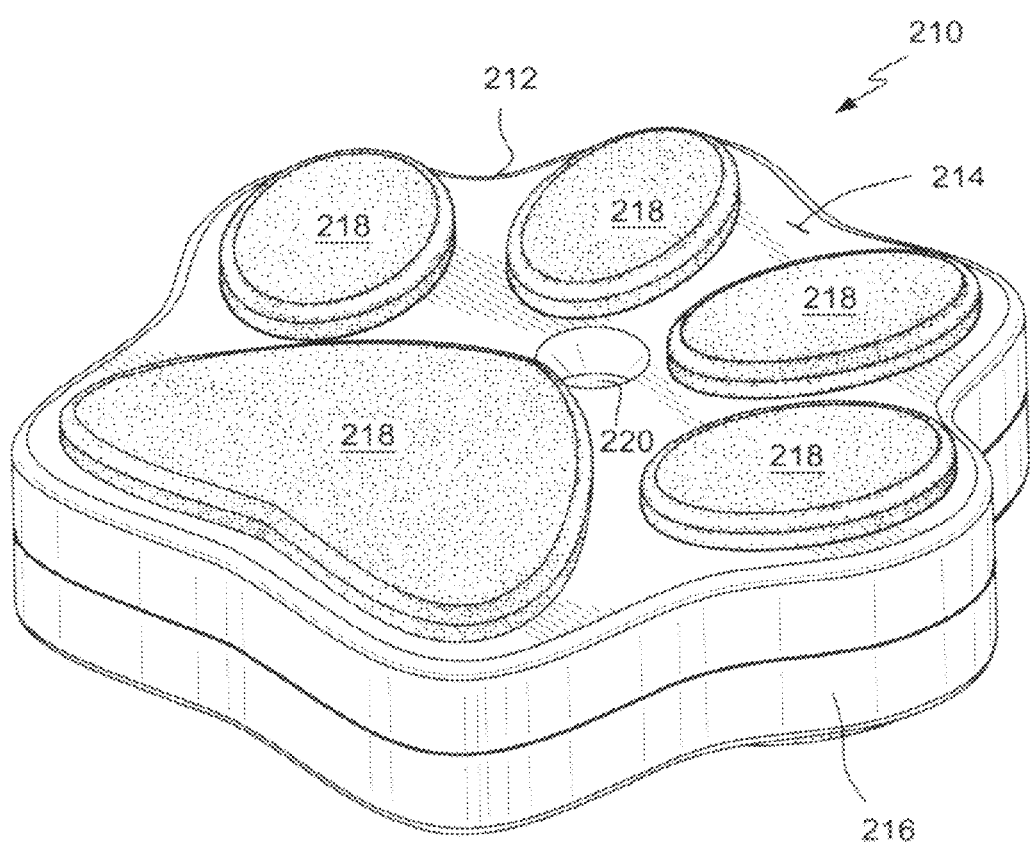
FIG. 13 is a perspective view of a no-mar bench paw workpiece provided in accordance with yet another example embodiment of the invention.
Figure 14:
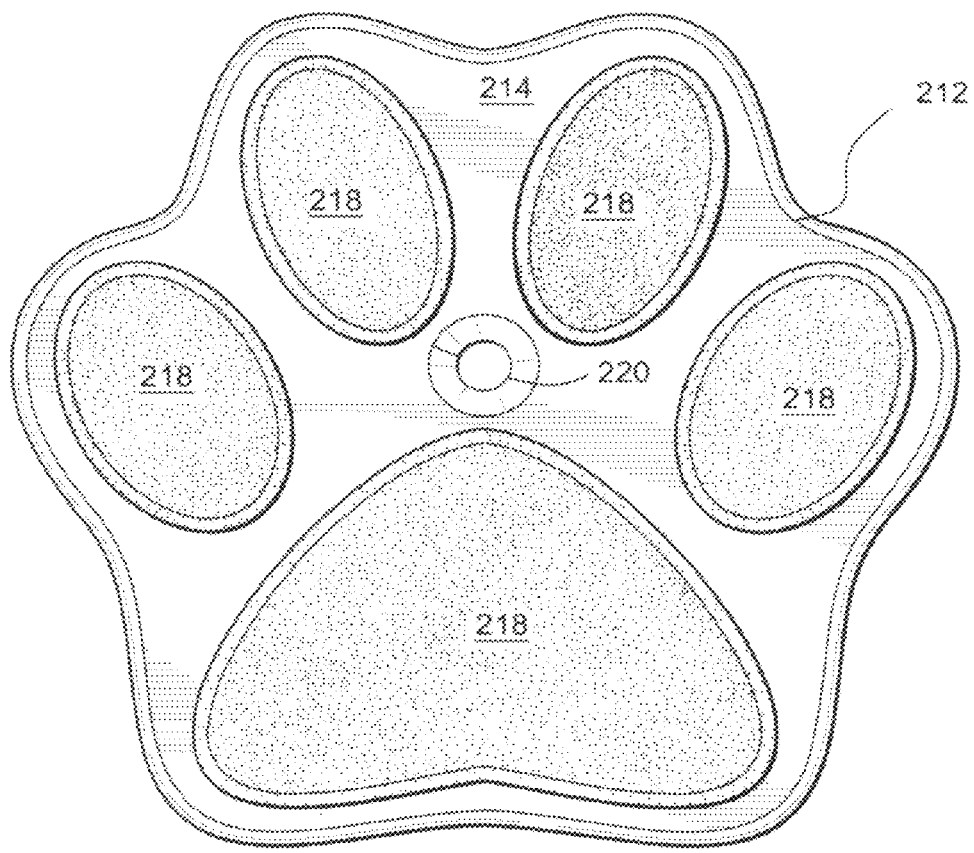
FIG. 14 is a top plan view of the embodiment of FIG. 13.
Figure 15:
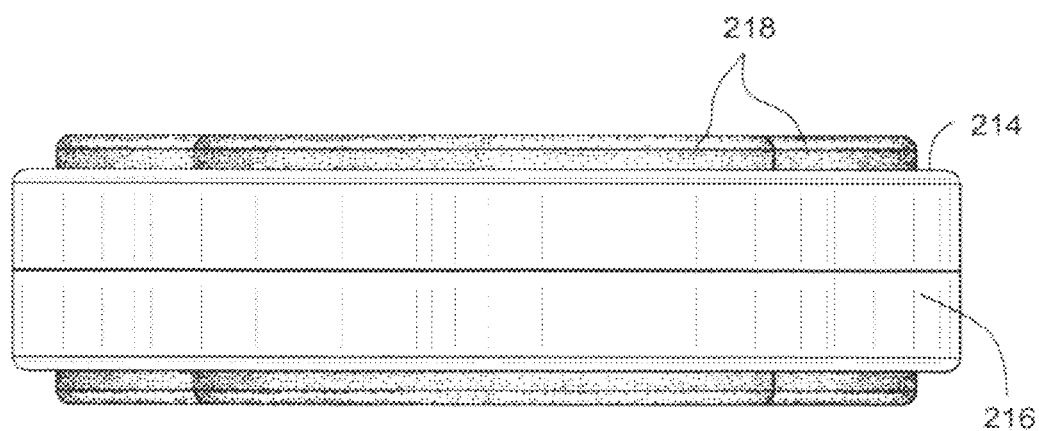
FIG. 15 is a rear elevational view of the embodiment of FIG. 13.
Figure 16:
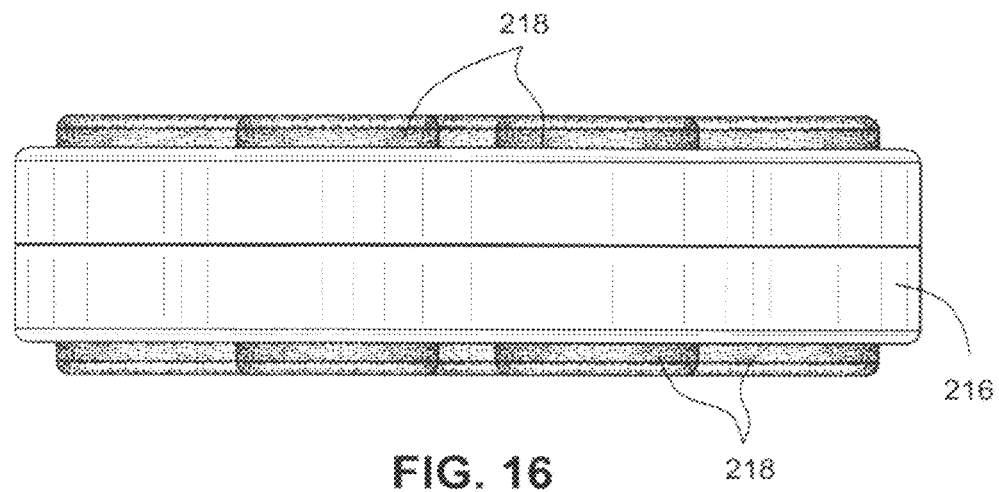
FIG. 16 is a front elevational view of the embodiment of FIG. 13.
Figure 17:
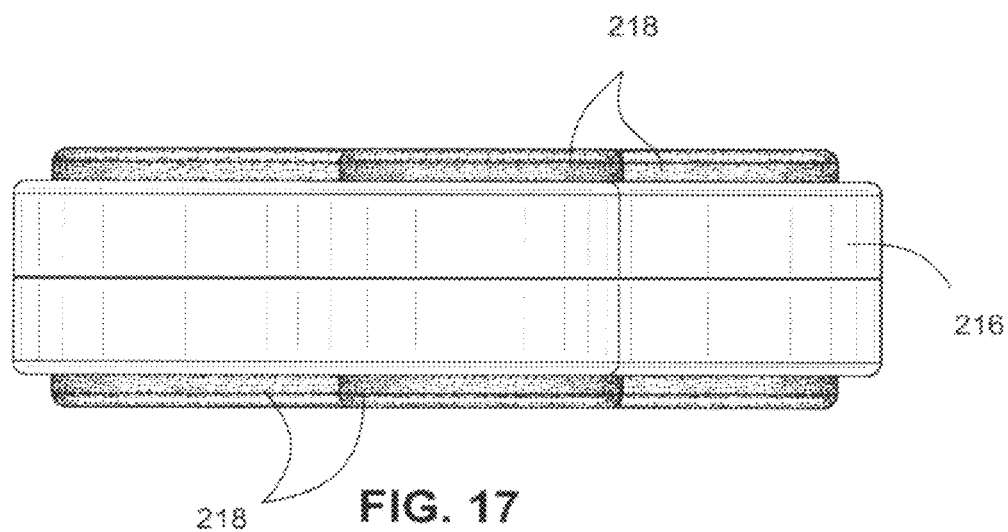
FIG. 17 is a right side elevational view of the embodiment of FIG. 13, the left side elevational view being a mirror image thereof.

The present invention provides a workpiece support that presents a generally planar workpiece contacting surface having high friction, gripping pad(s) that will not mar a workpiece surface, and thus provides a versatile accessory for home hobbyists and artisans alike that protects the supported surface of the workpiece. By providing a workpiece support, such as that illustrated in FIGS. 1, 8 and 13 to support a workpiece with respect to a work bench surface, the workpiece can be kept from slipping while routing, sanding, carving and the like. It can elevate workpieces for edge work and finishing, or simply suspend and protect projects from marring during drying or between work sessions. In an example embodiment, at least one and preferably a plurality of the workpiece supports are disposed at spaced locations between the workpiece and the work bench surface. For example, a workpiece support may be provided adjacent but spaced inwardly from each corner of a workpiece or, for smaller workpieces, a single workpiece support may be disposed at the center of the workpiece to elevate it above the work bench surface.

In presently preferred, example embodiments of the invention, the workpiece support is configured to resemble an animal paw and, as such, may be referred to as a "bench paw". In the embodiment illustrated in FIGS. 1-6, the bench paw workpiece support has the configuration of a canine paw, more specifically that of a wolf. In the embodiment illustrated in FIGS. 8-12, the bench paw workpiece support has the configuration of a bear paw. Finally, in the embodiment illustrated in FIGS. 13-17, the bench paw workpiece support has the configuration of a feline paw, more specifically that of a cougar. As will be appreciated from the description that follows, other whimsical configurations may be provided without departing from the invention. A paw configuration, as in the illustrated embodiments is particularly appealing to home hobbyists that also enjoy wildlife and/or hunting. Other whimsical configurations that may be provided may include other shapes appealing to the home hobbyist, such as symbols from playing cards (spade, diamond, heart and club/clover or the like). All such potential embodiments of the invention are characterized in that the workpiece support is generally symmetrical with respect to a longitudinal center line and, in most cases, asymmetrical with respect to a line transverse to the longitudinal center line (the exception being a diamond).

Referring to the embodiment of FIGS. 1-7, the workpiece support 10 includes a main body or housing 12 having first and second generally identical planar, major working surfaces 14 disposed as mirror images of one another, in parallel and supported in spaced apart relation. In an example embodiment, the first and second planar, major working surfaces are supported in spaced apart relation by an outer peripheral sidewall 16 that extends between the first and second major working surfaces 14.

For ease of description, the embodiment of FIGS. 8-12 is labeled with reference numerals corresponding to the reference numerals used in the embodiment of FIGS. 1-7 but incremented by 100. A separate description of those corresponding component parts is omitted except for emphasis or to the extent that the embodiments differ. Likewise, the embodiment of FIGS. 13-17 is labeled with reference numerals corresponding to those used and described with reference to FIGS. 1-7 but incremented by 200. Again, those component parts will not separately be described except for emphasis or to the extent the embodiments differ.

In the illustrated and presently preferred embodiments, the outer peripheral sidewall 16 defines an irregularly contoured outer peripheral edge of the major working surfaces, as noted above. In these examples, the irregularly contoured outer peripheral edge defines the outer periphery of a paw shape that is generally symmetrical with respect to a longitudinal center line of the main body and asymmetrical with respect to a line transverse to the longitudinal center line of the main body or housing.

At least one high friction, gripping non-marring elastomeric pad 18 is provided on each of the major working surfaces of the main body.

While the friction enhancing material pad(s) 18 may be adhesively secured to the workpiece support main body, in the presently preferred embodiment, pads 18, 118, 218 are overmolded to the molded main body 12. When the non-slip rubber material is joined to the major surfaces of the workpiece support in this way during the molding process, the pads become integral with the main body, so they won't come off like glued-on pads, even after prolonged use. In the illustrated embodiment, again consistent with the animal paw configuration of the presently preferred embodiments, a plurality of spaced apart elastomeric pads 18 are disposed on each of the major working surfaces 14. In the alternative, a pad can be formed on substantially the entirety of each of the major working surfaces, the pad including a plurality of elevated pad portions with recesses between the elevated pad portions. Whether the elastomeric pads are provided as discrete islands on each major surface, or as elevated pad portions with recesses therebetween, it will be appreciated that the elevated pads or pad portions 18 provide for gripping contact with a workpiece provided thereon, whereas the recesses therebetween provide a ventilation path and a path for dirt, shavings, sawdust and the like to fall away from the pad surfaces and the workpiece, and thus minimize the potential for marring of the workpiece surface.

In the illustrated embodiment, a counter sunk bore 20 is defined substantially through the center of the workpiece support 10. In one example, a screw (not shown) may be disposed through the counter sunk bore to screw and secure the workpiece support with respect to a bench surface. This holds the bench paw in place to ensure it will not slip relative to the work bench surface during routing, sanding or the like. The counter sunk ends of the bore ensure that the screw thus inserted and secured will not project from the major working surface so as to potentially mar the workpiece.

Figure 6:
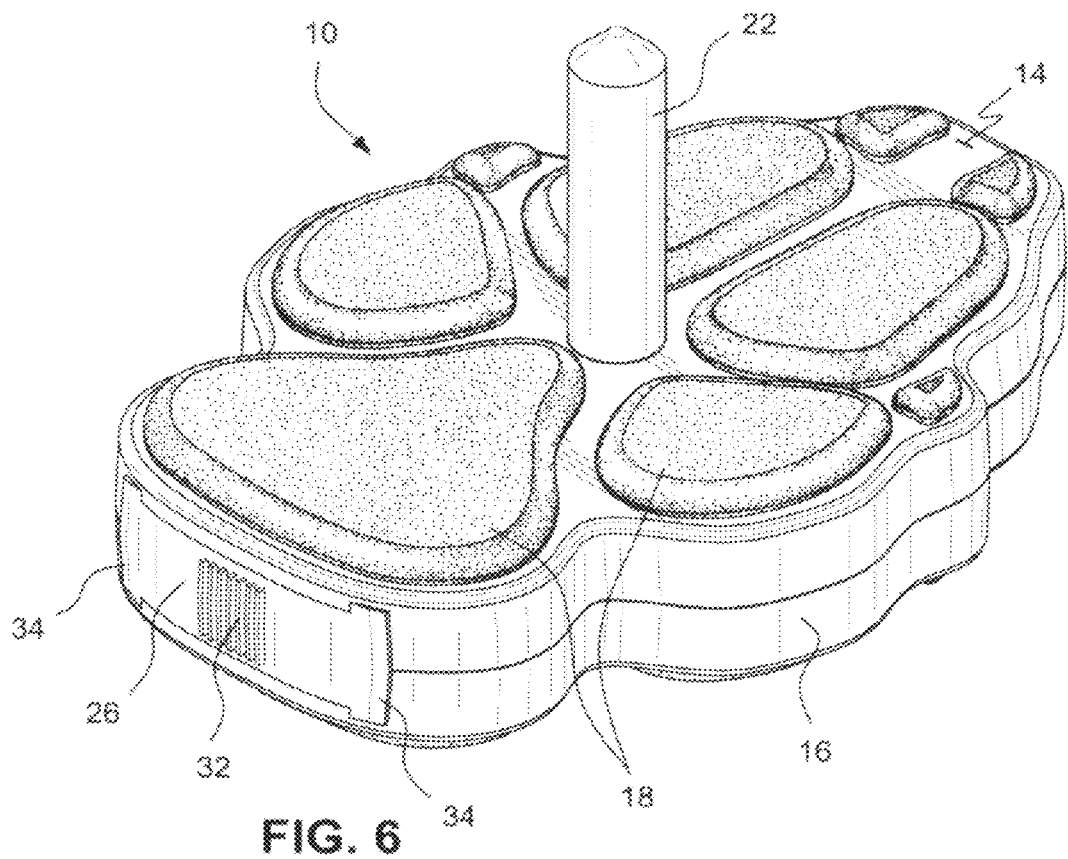
FIG. 6 is a view similar to FIG. 1, illustrating the workpiece support provided in accordance with the invention having a dowel for workpiece standoff.

As a further alternative, illustrated in FIG. 6, a dowel 22 of suitable diameter may be press fit into the counter sunk bore 20 for dowel standoff of the workpiece with respect to the workpiece support 10.

Figure 1:
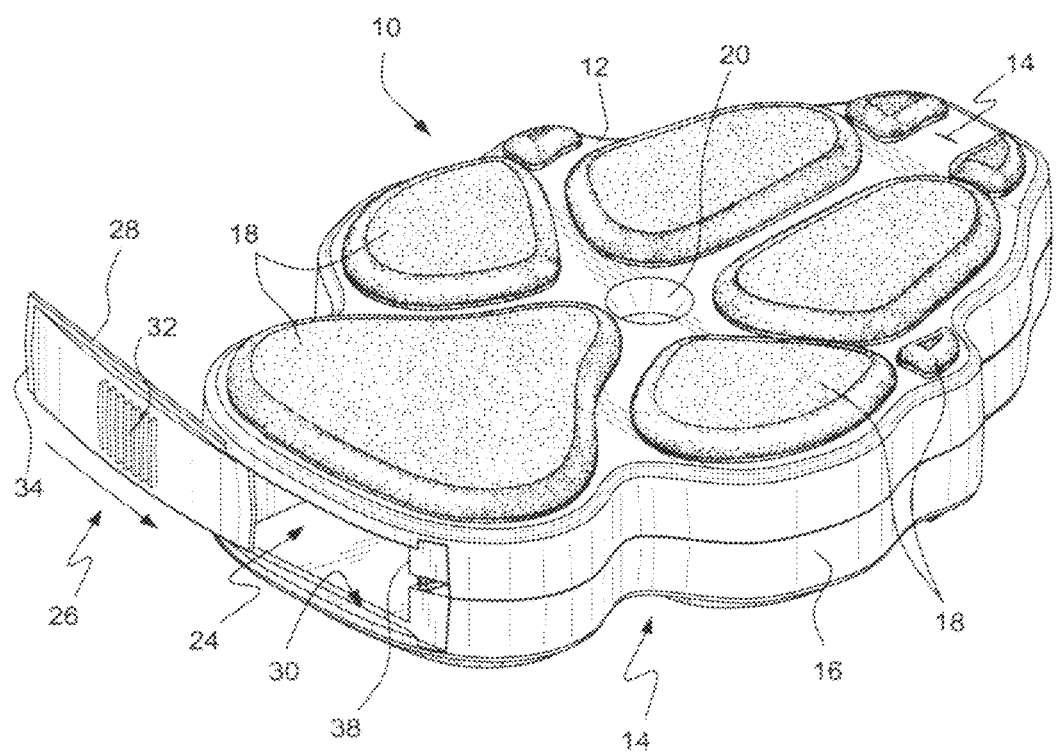
FIG. 1 is a perspective view of a no-mar bench paw workpiece support provided in accordance with one example embodiment of the invention.
Figure 2:
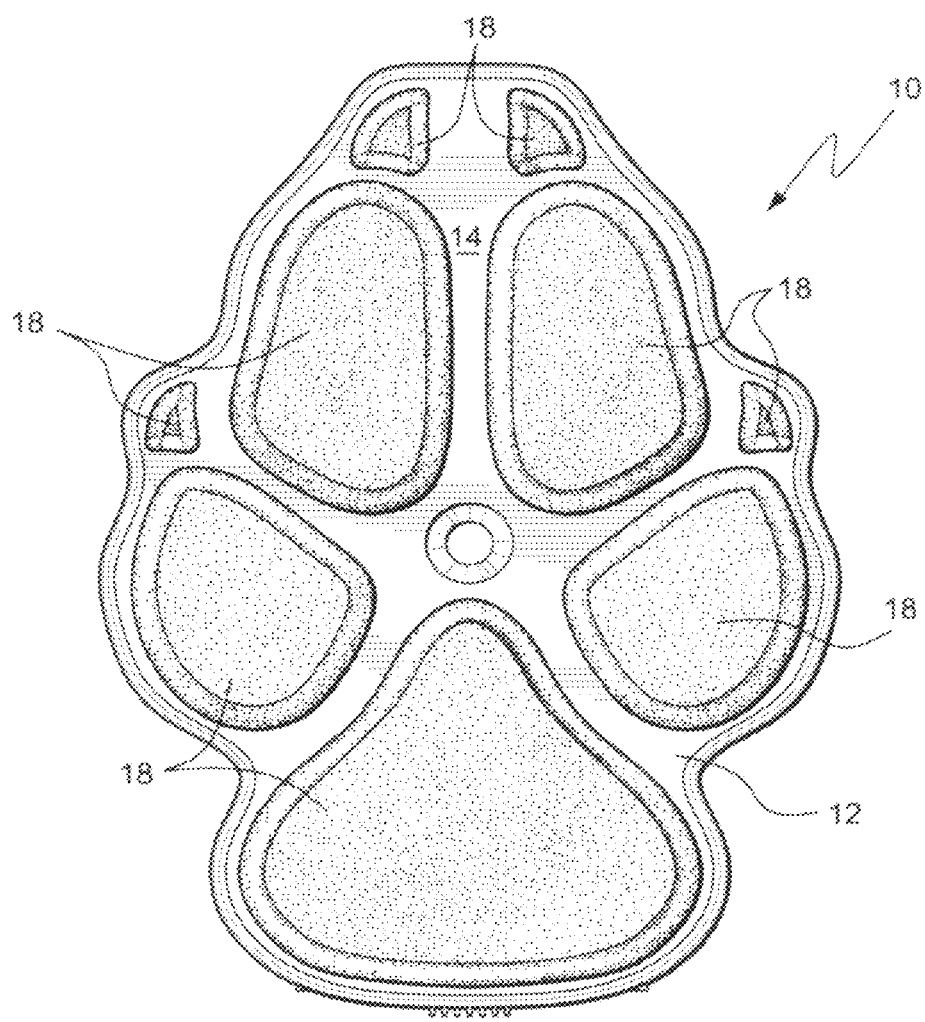
FIG. 2 is a top plan view of the embodiment of FIG. 1.
Figure 3:
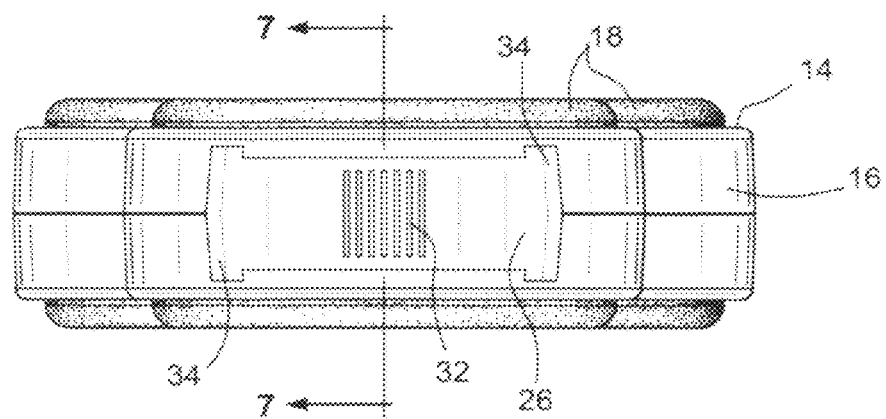
FIG. 3 is a rear elevational view of the embodiment of FIG. 1.
Figure 4:
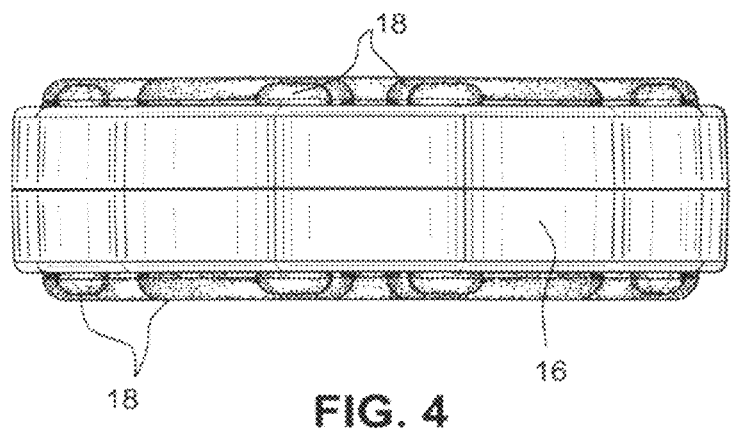
FIG. 4 is a front elevational view of the embodiment of FIG. 1.
Figure 5:
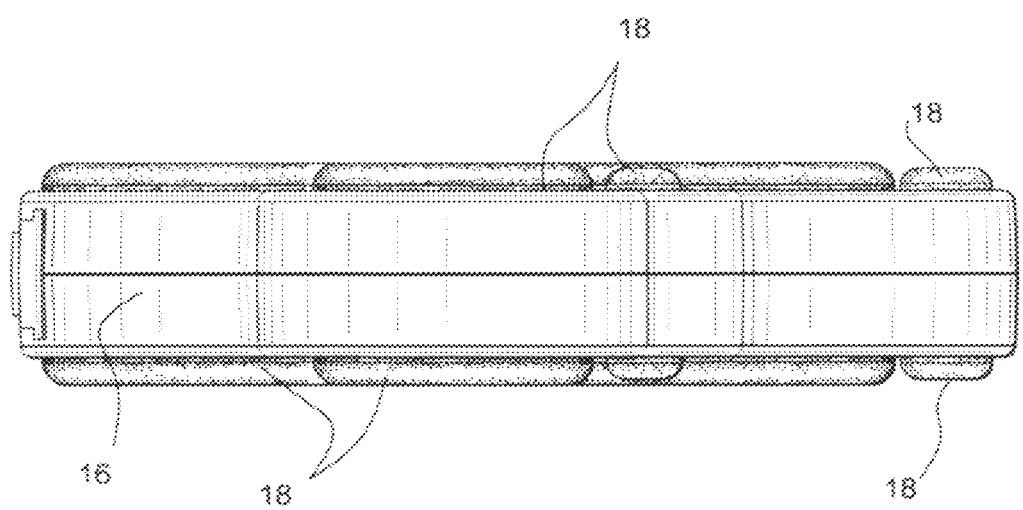
FIG. 5 is a right side elevational view of the embodiment of FIG. 1, the left side elevational view being a mirror image thereof.
Figure 7:
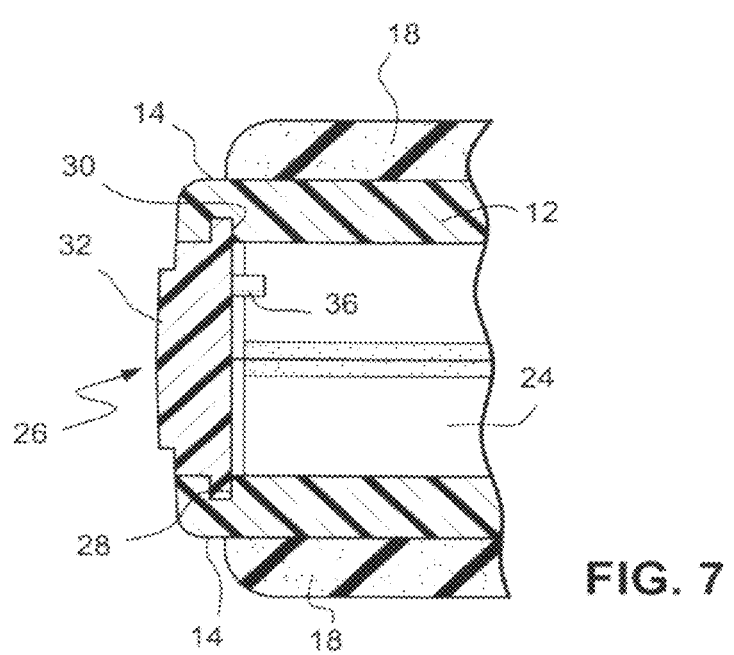
FIG. 7 is a cross-sectional view taken along lines 7-7 of FIG. 3.

As illustrated in FIGS. 1, 3 and 7, for example, a storage compartment 24 is defined within the workpiece support 10 and an access door 26 is slidably mounted to the rear end of the workpiece support 10 to provide selective access to the storage compartment 24. In the illustrated embodiment, the access door has thinned upper and lower flanges 28 that are slidably received in correspondingly shaped grooves 30 in the sidewall 16 of the main body or housing 12. In the illustrated embodiment, a ribbed surface 32 is defined on the access door and a ridge or lip 34 is defined at each longitudinal end of the access door, so that the access door can be easily slid to the side with a thumb, as illustrated in FIG. 1. While the storage compartment can be accessed with the access door partially opened by sliding to the left or right, the access door can be completely disengaged from the main housing for full access to the storage compartment. As illustrated in FIG. 7, a projecting stop pin 36 may be formed on the inner surface of the access door to engage the sidewall 16 at the end of the access opening to the storage compartment at 38 (FIG. 1) to stop the access door in the closed position. A recessed portion may be provided in the sidewall at the opposite side of the access opening (obscured by the access door in FIG. 1) to allow the access door to be fully removed from the workpiece support 10. In an example embodiment, a screw (now shown) for securing the workpiece support and/or dowel member(s) 22 may be stored within the storage compartment 24 when not in use. Of course, other fasteners or tools may be stored within the workpiece support. Moreover, the storage compartment may be accessed by a door provided on the front end or side of the workpiece support in the alternative or in addition.

By way of example, the canine or wolf paw workpiece support 10 illustrated in FIGS. 1-6 is about 4.15 inches long and, including the pads 18, is about 1 inch thick. The pads themselves have a height of about 0.1 inch. The width of this example embodiment is about 2.95 inches, the door is about 1.42 inches long and about 0.5 inches high excluding the sliding flanges 28.

As mentioned above, in the embodiment illustrated in FIG. 1, the bench paw workpiece support is the configuration of a canine paw, more specifically, the configuration of a wolf paw. FIGS. 2-5 illustrate the canine or wolf bench paw configuration from the top, rear, front and side, respectively. As an alternative, a bench paw configured as a bear paw is illustrated in FIGS. 8-12. In this embodiment, mimicking the claws of a bear, the pads 118 overmolded to the major working surfaces of the main body are not all symmetrical with respect to the longitudinal center line of the main body because of the curvature of the claw mimicking pads. However, the main body or housing 112 is nevertheless symmetrical with respect to the longitudinal center line, so that the workpiece support itself 110 would be considered generally symmetrical with respect to that longitudinal center line. In this embodiment, the no-mar elastomeric pads 118 are spaced apart from one another to define ventilation and/or debris paths. Although discrete pads are illustrated, as noted above, a pad may be provided substantially on the entirety of each major working surface 114 with elevated pad portions 118 defining the discrete no-mar workpiece contacting surfaces with recesses therebetween. The bear paw embodiment is not illustrated with an access door and storage compartment, although such accessories could be adopted in this embodiment as well. A bore 120 for a securing screw and/or dowel is again provided, however, so that the bench paw can be selectively secured to a work bench and/or the workpiece can be supported in the standoff manner.

By way of example, the bear paw is about 5.4 inches long, about 4.54 inches wide, and the thickness is about 1.275 inches (1.7 inches including the pads 118, which in this embodiment are about 0.2 inches thick).

Other paw configurations that may be provided include a feline paw, such as a cougar paw, as illustrated in FIGS. 13-17. In this embodiment, again, the no-mar pads 218 are overmolded to a plastic main body or housing 212 as a plurality of spaced apart elastomeric pads defined as discrete islands so that the recesses therebetween provide a ventilation path as well as a path for debris to fall away from the workpiece surface. Advantageously, the discrete pads are thus functional in addition to their ornamental configuration as the pads of an animal paw. As in the embodiment of FIG. 1, a bore 220 is provided for securing the feline bench paw with respect to a work bench surface with, e.g., a screw, or for inserting a dowel for standoff support of a workpiece. An access door and interior compartment are not illustrated in this embodiment, but may be provided as in the embodiment of FIGS. 1-7. As in the first embodiment, the feline paw is generally symmetrical with respect to the longitudinal axis of the workpiece support and asymmetric with respect to any line transverse to the longitudinal axis.

By way of example, the feline or cougar paw is about 3.1 inches long and about 3.2 inches wide, and the thickness is about 0.75 inches (1 inch including the pads 218, which in this embodiment are about 0.125 inches thick).

As will be understood from the foregoing, the workpiece support 10, 110, 210 provided in accordance with the invention allows the home hobbyists or artisan to rout, sand, carve, cut, finish, or otherwise work upon a workpiece without using auxiliary clamps, and they may do so on any surface or on any part of a work bench surface, so that it is unnecessary to use a clamp or the like to secure the workpiece near an edge of a working surface. The workpiece support 10, 110, 210 allows the workpiece to be raised up for easy edge finishing and supports projects without leaving marks, particularly on a previously finished surface. Additionally, the workpiece support may be used to assist the home hobbyist or artisan in assembling projects on a stable non-slip support. The high friction pads 18, 118, 218 provided on both major, working surfaces 14, 114, 214 of the main body or housing 12, 112, 212 of the workpiece support 10, 110, 210 grab the work bench surface and the workpiece simultaneously for a secure hold while the workpiece is worked upon.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A workpiece support comprising:
a main body having first and second generally planar working surfaces disposed in parallel and supported in spaced apart relation;
at least one elastomeric pad disposed on the surface of each of said first and second working surfaces; and
said first and second working surfaces have correspondingly shaped, irregularly contoured outer peripheral edges, wherein
said at least one elastomeric pad comprises a plurality of spaced apart, raised elastomeric pad portions provided on each of said first and second working surfaces, the plurality of spaced apart elastomeric pad portions provided on said first working surface being disposed as a mirror image of the plurality of spaced apart elastomeric pad portions provided on said second working surface.

2. The workpiece support as in claim 1, wherein the outer peripheral edge of each of said first and second working surfaces is configured as an animal paw in plan view.

3. The workpiece support as in claim 2, wherein the outer peripheral edge of each of said first and second working surfaces is configured as a canine paw.

4. The workpiece support as in claim 2, wherein the outer peripheral edge of each of said first and second working surfaces is configured as a bear paw.

5. The workpiece support as in claim 2, wherein the outer peripheral edge of each of said first and second working surfaces is configured as a feline paw.

6. The workpiece support as in claim 1, wherein said plurality of spaced apart elastomeric pad portions are overmolded to each of said first and second working surfaces.

7. The workpiece support as in claim 1, wherein said plurality of spaced apart elastomeric pad portions have a plurality of different sizes and/or shapes.

8. The workpiece support as in claim 7, wherein said plurality of spaced apart pad portions are configured as pads of an animal paw.

9. The workpiece support as in claim 1, wherein said plurality of spaced apart pad portions are formed as discrete raised pads with recesses therebetween.

10. The workpiece support as in claim 1, further comprising a bore defined to extend through and between said working surfaces, said bore having an axis generally perpendicular to said working surfaces and sized to accommodate at least one of a dowel and a screw, wherein said bore further comprises a larger axial recess.

11. A workpiece support comprising a housing having first and second major surfaces disposed in spaced apart, parallel relation and an outer peripheral sidewall extending between said major surfaces, said outer peripheral sidewall defining an irregular outer periphery that is asymmetrical with respect to a line transverse to a longitudinal center line of said housing,
at least one elastomeric pad disposed on each of said first and second major surfaces, and
a bore defined to extend through said housing between said major surfaces, said bore having an axis generally perpendicular to said major surfaces and sized to accommodate at least one of a dowel and a screw.

12. The workpiece support as in claim 11, wherein said at least one pad is overmolded to each said major surface.

13. The workpiece support as in claim 11, wherein the outer peripheral sidewall is configured to define an animal paw in plan view.

14. The workpiece support as in claim 11, wherein a plurality of spaced apart elastomeric pads are disposed on each said major surface.

15. The workpiece support as in claim 14, wherein said plurality of spaced apart elastomeric pads includes pads having a plurality of different sizes and/or shapes.

16. The workpiece support as in claim 11, further comprising an interior compartment defined within said housing and an access door defined in said outer peripheral sidewall for providing selective access to said interior compartment.

17. The workpiece support as in claim 11, wherein said at least one elastomeric pad comprises a plurality of spaced apart elastomeric pad portions provided on each of said first and second major surfaces, the plurality of spaced apart elastomeric pad portions provided on said first major surface being disposed as a mirror image of the plurality of spaced apart elastomeric pad portions provided on said second major surface.

18. The workpiece support as in claim 17, wherein said plurality of spaced apart pad portions are formed as discrete raised pads with recesses therebetween.

19. The workpiece support as in claim 17, wherein said plurality of spaced apart elastomeric pad portions have a plurality of different sizes and/or shapes.

20. The workpiece support as in claim 19, wherein said plurality of spaced apart pad portions are configured as pads of an animal paw.

* * * * *